US012296328B2

(12) United States Patent
Posselt et al.

(10) Patent No.: US 12,296,328 B2
(45) Date of Patent: May 13, 2025

(54) DIRECTLY ELECTRICAL HEATED REACTOR

(71) Applicant: BASF SE, Ludwigshafen (DE)

(72) Inventors: Heinz Posselt, Pullach (DE); Otto Machhammer, Pullach (DE); Markus Weikl, Pullach (DE); Nicolai Antweiler, Essen (DE); Karsten Büker, Dortmund (DE)

(73) Assignee: BASF SE, Ludwigshafen am Rhein (DE)

( * ) Notice: Subject to any disclaimer, the term of this patent is extended or adjusted under 35 U.S.C. 154(b) by 763 days.

(21) Appl. No.: 17/595,882

(22) PCT Filed: May 27, 2020

(86) PCT No.: PCT/EP2020/025247
§ 371 (c)(1),
(2) Date: Nov. 29, 2021

(87) PCT Pub. No.: WO2020/244803
PCT Pub. Date: Dec. 10, 2020

(65) Prior Publication Data
US 2022/0234020 A1 Jul. 28, 2022

(30) Foreign Application Priority Data
Jun. 5, 2019 (DE) .................... 10 2019 003 982.3

(51) Int. Cl.
*B01J 8/12* (2006.01)
*B01J 8/42* (2006.01)
*B01J 19/08* (2006.01)
*C01B 3/24* (2006.01)

(52) U.S. Cl.
CPC .. *B01J 8/12* (2013.01); *B01J 8/42* (2013.01); *B01J 19/087* (2013.01); *C01B 3/24* (2013.01); *B01J 2208/00389* (2013.01); *B01J 2208/00407* (2013.01); *B01J 2219/083* (2013.01)

(58) Field of Classification Search
CPC ............ B01J 19/087; B01J 2208/00389; B01J 2208/00407; B01J 2219/083; B01J 2219/0833; B01J 2219/0839; B01J 8/087; B01J 8/12; B01J 8/42; C01B 3/24
See application file for complete search history.

(56) References Cited

U.S. PATENT DOCUMENTS

| | | | |
|---|---|---|---|
| 2,982,622 A | 5/1961 | Jahnig et al. | |
| 4,255,403 A | 3/1981 | Mayer et al. | |
| 5,114,700 A | * | 5/1992 | Meihack .................. C01B 17/06 165/172 |

(Continued)

FOREIGN PATENT DOCUMENTS

RU    2005114466    * 11/2006

OTHER PUBLICATIONS

RU2005114466 English translation (Year: 2024).*

*Primary Examiner* — Jennifer Wecker
*Assistant Examiner* — Jonathan Bortoli
(74) *Attorney, Agent, or Firm* — Grüneberg and Myers PLLC

(57) ABSTRACT

The invention relates to a reactor comprising a moving bed of solid particles that move in the direction of gravitation, and to a method for heating a reactor that comprises a moving bed, for the purpose of pyrolysis reactions.

14 Claims, 1 Drawing Sheet

(56) References Cited

U.S. PATENT DOCUMENTS

| | | | | |
|---|---|---|---|---|
| 2007/0154382 A1* | 7/2007 | Edwin | ............... | D01F 9/1278 |
| | | | | 422/139 |
| 2010/0068116 A1* | 3/2010 | Kim | ............... | C23C 16/24 |
| | | | | 423/349 |
| 2016/0090535 A1* | 3/2016 | Abdullah | ............... | B01J 8/388 |
| | | | | 201/4 |
| 2019/0151817 A1 | 5/2019 | Henriksson et al. | | |

* cited by examiner

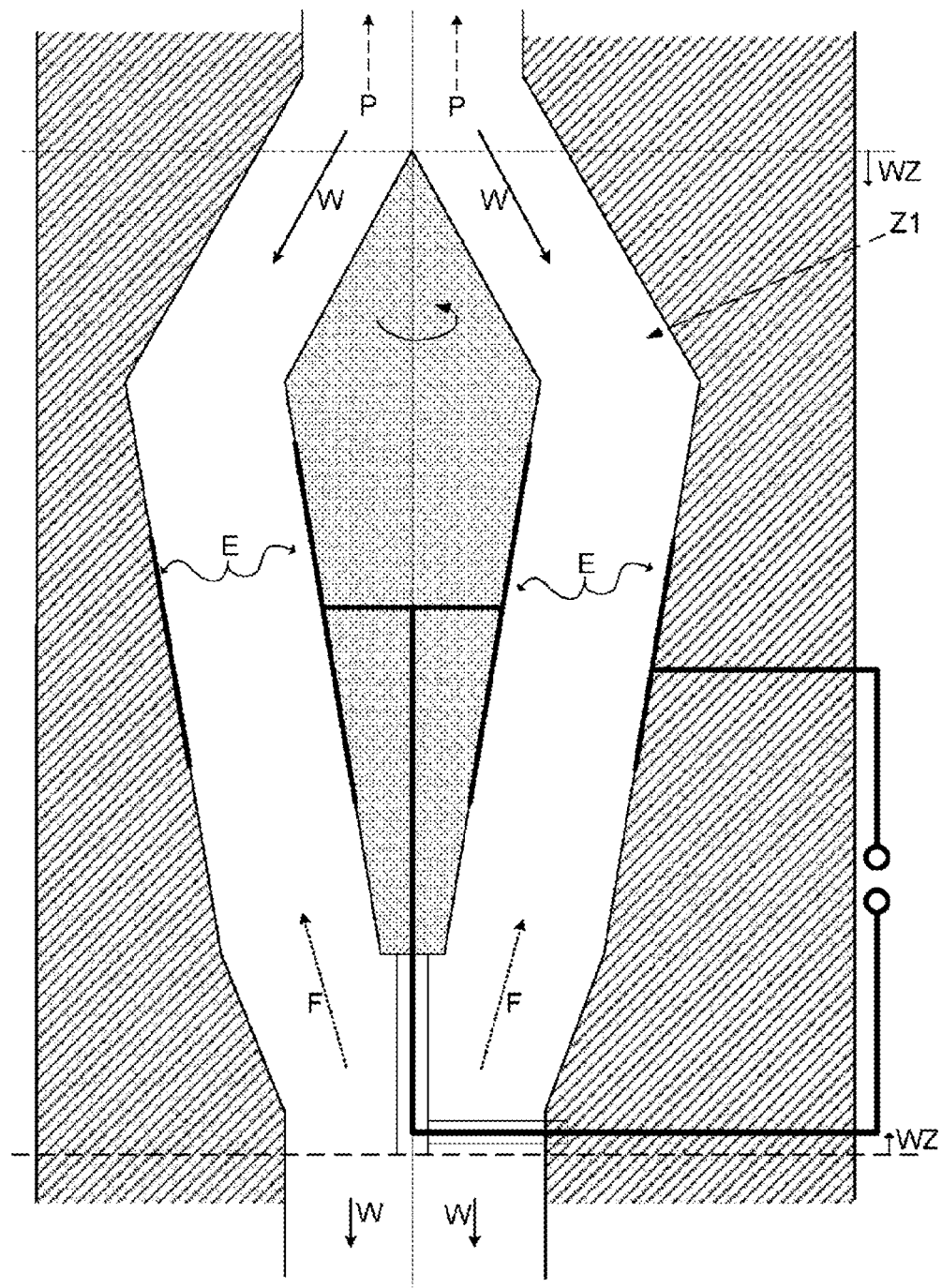

DIRECTLY ELECTRICAL HEATED REACTOR

The invention relates to a reactor comprising a moving bed of solid particles that move in the direction of gravitation, and to a method for heating a reactor that comprises a moving bed, for the purpose of pyrolysis reactions.

As an alternative to the established prior art, U.S. Pat. No. 2,982,622. discloses, for example, a method for producing hydrogen and high-grade coke in which inert solid material particles are passed as bulk material through an elongated reaction zone in the direction of gravitation, hereinafter referred to as moving bed; an electrical voltage of 0.1 to 1000 volts per inch is applied across at least a portion of the solid material mass in the reaction zone, wherein the voltage is sufficient to increase the temperature of the solids to 1800° F. to 3000° F. (980° C. to 1650° C.). A gas stream of hydrocarbons, preferably natural gas, is guided in the counterflow, which gas stream produces hydrogen via the endothermic pyrolysis reaction and deposits carbon onto the introduced particles $$CH_4 <-> C(s) + 2H_2.$$

Heat integration can be achieved by the counterflow condition of solid and gas, whereby a high method efficiency is enabled. When current generated with the aid of renewable energies is used, the $CO_2$ balance of the hydrogen production method can be improved by dispensing with fossil heating by means of ohmic, direct electrical heating.

Reactors of the prior art, which are suitable for high-temperature reactions at above 900° C., have previously been constructed largely cylindrically. Electrodes for heating the reactors were optionally integrated into the cylinder wall, or arranged axially in the reactor, at least such that a fixed bed fill or a moving bed was not impeded. Such a reactor is shown in U.S. Pat. No. 2,982,622, for example. However, a disadvantage of such a purely cylindrical reactor geometry with the electrodes as installations is that, in the event of a central inner rod electrode, the electric field is radially inhomogeneous and the reaction therefore does not take place uniformly in the reactor volume. In the event of electrodes integrated in the cylinder wall, carbon, which is deposited on the wall, can lead to electrical shorts that likewise prevent homogeneous heating of the reactor. The precipitated carbon also leads to the result that the particles of the moving bed pack, whereby their pourability is impaired the reactor is blocked up.

The object of the present invention is therefore to specify a reactor geometry and an arrangement of the electrodes given which the disadvantages of the prior art can be overcome.

On the device side and on the method side, the object is achieved in that the the flow cross-section of the reactor changes over the length of the reaction zone, and electrical electrodes are arranged in an annular concentric manner in the reaction zone. The moving bed, which is heated by the electrodes, is guided through this reaction zone.

Via the forced relative movement of the particles of the moving bed due to the changing flow cross-section, an agglomeration of the particles by deposited carbon is prevented. The annularly concentric electrodes can be arranged continuously or intermittently in an axially symmetric arrangement or, in the event of pyramidal reactor geometries, as a flat surface. Short circuits are also avoided, since the due to the concentric arrangement with electrodes located on the inside and outside, must always flow through the fill first.

The electrodes are thereby preferably made of a graphite-containing material and have a varying conductivity over their length.

The flow cross-section of the reactor preferably changes over the length of the reaction zone in such a way that it has a conical or almost conical shape. The conical part of the reactor is thereby preferably arranged in such a way that the wider part of the cone is arranged in the supply region of the moving bed. In most instances, this is at the top in the direction of gravitation. It goes without saying for a person skilled in the art that exact radial symmetry cannot always be observed with corresponding industrial reactor geometries, and reactors are constructed rather more as a polygon. The reactor is moreover also preferably designed as an annular gap. This annular gap can be technically evenly straight, but can also increase or decrease over the reactor length. Various installations, for example pyramid-shaped geometries, can be provided in the reactor for this purpose. Via an embodiment as an annular gap, the annular concentric arrangement of the electrodes can be further optimized and the aforementioned advantages increase.

The reactor also has inlets and outlets for gaseous educts and products, so that the educt and product stream can be guided in counterflow to the moving bed. Furthermore, additional supply lines for refrigerant gas can be provided near the product outlet. Cold product gas or inert gas is preferably used as a refrigerant gas.

The moving bed is preferably heated to temperatures from 900 to 1200° C.

The described reactor and the described method are preferably used for methane pyrolysis, wherein a methane-containing gas stream is used as the educt.

In a particular embodiment, the cold moving bed is supplied to the reactor from above via a cylindrical inlet. The moving bed is subsequently transferred via a conical expansion of the cylinder tube into a narrowing additional cone. The moving bed is passed through the reactor in the direction of gravitation. In an additional embodiment variant, an installation can be present within the cones so as to form an annular shaft. The conical shape, intensified by the annular shaft, results in a relative movement between the particles of the moving bed. Carbon deposits can thereby be deposited on the particles of the moving bed and be discharged, together with the moving bed, at the lower end of the reactor at the outlet of the moving bed, which in turn is preferably cylindrical.

Electrodes which are installed on the wall of the reactor or of the installation are mounted inside the conical part of the reactor, or in the annular shaft. These electrodes heat the moving bed, which is passed between them. Short circuits are thereby avoided since carbon is deposited only in the hot zone, but the electrical contacting takes place in the cold region.

The electrodes preferably have a rounded shape at the ends. Conductivity is advantageously minimized at the respective electrode ends. This is done by minimizing the electrode surface and/or by a modified material composition. The flow resistance for the moving bed is minimized by the described geometric shapes of the electrodes. An additional advantage is that a settling of the carbon particles or a caking is thereby prevented. Hot zones at the electrode ends are avoided and thereby do not impair the reaction.

The educt and product stream are guided in counterflow to the moving bed in the reactor. Cold educt stream is supplied, which is heated by the exiting hot moving bed. Due to the heat exchange, the cold moving bed can be withdrawn directly from the reactor and does not need to be cooled further. The heat within the reactor is kept in a heat integration zone by the counterflow guidance, and an energy-efficient control of the reaction is possible.

In order to control the temperature profile of the reactor, in a particularly preferred embodiment variant of the reactor, refrigerant gas is supplied if necessary via a supply line near the product outlet. The refrigerant gas is preferably already cooled product gas.

In addition to methane pyrolysis, the reactor can also be used for other reactions.

Further features and advantages of the invention will be explained in the description of an exemplary embodiment, with reference to FIG. 1. Figures show:

FIG. 1 a sectional view of a reactor according to the invention

FIG. 1 shows a preferred reactor geometry in sectional view. A moving bed W is supplied to the reactor from above via a cylindrical supply line. The outer reactor wall is preferably insulated by a lining.

The moving bed W is guided into an annular shaft which is executed from two cones of diametrically opposed design. The annular shaft is realized by installations. Annularly concentric electrodes E are attached to the wall of the ring shaft and the installations.

The reactor is preferably used for the pyrolysis of methane. For this purpose, a methane-containing feed stream F is supplied in counterflow to the moving bed W. The feed stream is heated to 900 to 1200° C. and reacted into hydrogen and carbon or synthesis gas. The product stream P is withdrawn at the upper end of the reactor.

An effective heat integration is achieved by the counterflow method, and no complex devices for cooling or pre-tempering the moving bed or gas streams are necessary.

In order to be able to control the temperature profile within the reactor, refrigerant gas can be supplied via a supply line Z. In this example, cold product gas is preferably used as a refrigerant gas.

The invention claimed is:

1. A reactor for carrying out a pyrolysis reaction, the reactor comprising:
   a high end and a low end;
   a reaction zone having a length and varying flow cross-sections over the length;
   a moving bed of solid particles having an outlet at the low end of the reactor and configured to move in a high end to low end downward direction;
   electrical electrodes disposed in an annularly concentric configuration within the reaction zone; and
   an educt inlet for gaseous educts and a product outlet for products, wherein the educt inlet and the product outlet are disposed in a manner so that in operation, an educt and product stream can move in a low end to high end upward direction in counterflow relative to a movement of the moving bed in the high end to low end downward direction.

2. The reactor according to claim 1, wherein the electrical electrodes have a length, varying conductivities over the length, and contain a graphite-containing material.

3. The reactor according to claim 1, wherein the varying flow cross-sections of the reactor change over the length of the reaction zone such that the varying flow cross-sections have a conical or nearly conical shape.

4. The reactor according to claim 1, further comprising a plurality of supply lines for supplying a refrigerant gas to the reactor, wherein the plurality of supply lines are near the product outlet.

5. The reactor according to claim 1, wherein the reactor has a conical part and a cone having a wide part, and the moving bed has a supply region, the conical part arranged such that the wide part of the cone is arranged in the supply region of the moving bed.

6. A method of heating the moving bed of particles through the reactor of claim 1 and of carrying out a pyrolysis reaction the method comprising heating the moving bed by passing the moving bed through the reactor whereby the moving bed is heated by the electrical electrodes and a pyrolysis reaction is carried out.

7. The method according to claim 6, further comprising guiding the moving bed in counterflow relative to a moving direction of the educt and product stream.

8. The method according to claim 6, wherein the heating the moving bed is performed by heating the moving bed to a temperature of not less than 900 C and not more than 1200 C.

9. The method according to claim 6, further comprising using a gas stream educt containing methane, and performing a methane pyrolysis using the reactor.

10. The method according to claim 6, further comprising cooling an exiting product stream by supplying a refrigerant gas near the product outlet.

11. The reactor according to claim 1, wherein the solid particles are capable of passing in bulk through the reaction zone in a direction of gravitation.

12. The reactor according to claim 1, wherein the moving bed has a supply region and wherein the varying flow cross sections of the reactor vary over the length of the reaction zone such that the reaction zone has a conical shape, the reactor further comprising a cone having a wide part wherein the wide part of the cone is arranged in the supply region of the moving bed.

13. The reactor according to claim 1, wherein the electrical electrodes are configured to heat the moving bed in the reaction zone.

14. The method of claim 6, further comprising withdrawing the moving bed directly from the reactor wherein prior to the withdrawing of the moving bed, due to heat exchange between a stream and the moving bed, the moving bed has a temperature lower than prior to the heat exchange between the stream and the moving bed.

* * * * *